(12) United States Patent
Hoppe

(10) Patent No.: US 9,089,876 B2
(45) Date of Patent: Jul. 28, 2015

(54) SEPARATING MACHINE AND METHOD

(75) Inventor: Jürgen Hoppe, Bergisch Gladbach (DE)

(73) Assignee: modernpack Hoppe GmbH, Bergisch Bladbach (DE)

( * ) Notice: Subject to any disclaimer, the term of this patent is extended or adjusted under 35 U.S.C. 154(b) by 228 days.

(21) Appl. No.: 13/813,198

(22) PCT Filed: Aug. 3, 2011

(86) PCT No.: PCT/EP2011/063359
§ 371 (c)(1),
(2), (4) Date: Jan. 30, 2013

(87) PCT Pub. No.: WO2012/017002
PCT Pub. Date: Feb. 9, 2012

(65) Prior Publication Data
US 2013/0129887 A1      May 23, 2013

(30) Foreign Application Priority Data

Aug. 4, 2010   (DE) ..................... 20 2010 011 056 U

(51) Int. Cl.
| | |
|---|---|
| *A22C 17/04* | (2006.01) |
| *B07B 1/24* | (2006.01) |
| *B30B 9/24* | (2006.01) |
| *B30B 15/34* | (2006.01) |

(52) U.S. Cl.
CPC . *B07B 1/24* (2013.01); *A22C 17/04* (2013.01); *B30B 9/241* (2013.01); *B30B 15/34* (2013.01)

(58) Field of Classification Search
CPC ......... A22C 17/04; B30B 9/241; B30B 15/34
USPC .................. 209/238, 262, 284, 288; 426/479; 99/457, 460, 464, 466
See application file for complete search history.

(56) References Cited

U.S. PATENT DOCUMENTS

| | | | | |
|---|---|---|---|---|
| 2,365,658 | A | * | 12/1944 | Schumacher ................. 100/121 |
| 3,320,680 | A | | 5/1967 | Paschke et al. |
| 3,813,082 | A | * | 5/1974 | Manser ......................... 366/76.6 |
| 4,156,384 | A | * | 5/1979 | Hinds et al. ..................... 99/459 |

(Continued)

FOREIGN PATENT DOCUMENTS

| | | |
|---|---|---|
| DE | 575453 C | 4/1933 |
| DE | 3143474 C1 | 5/1983 |

(Continued)

OTHER PUBLICATIONS

Int'l Search Report issued Nov. 25, 2011 in Int'l Application No. PCT/EP2011/063359; Written Opinion.

(Continued)

*Primary Examiner* — Joseph C Rodriguez
(74) *Attorney, Agent, or Firm* — Panitch Schwarze Belisario & Nadel LLP

(57) ABSTRACT

A separating machine for separating products of soft and harder consistency includes a drum which is drivable in rotation about its axis and the peripheral surface of which has a plurality of holes. A pressing device which by means of a pressing element presses the product to be separated against the peripheral surface of the drum so that product components of soft consistency pass through the drum. A cooling device is provided for cooling the pressing device or the pressing element thereof.

18 Claims, 2 Drawing Sheets

(56) References Cited

U.S. PATENT DOCUMENTS

| | | | |
|---|---|---|---|
| 4,899,890 A * | 2/1990 | Ewing et al. | 209/699 |
| 5,241,901 A * | 9/1993 | Kunig | 99/495 |
| 5,320,036 A * | 6/1994 | Krohn et al. | 100/154 |
| 5,507,689 A | 4/1996 | McFarland et al. | |
| 5,823,866 A * | 10/1998 | Kunig | 452/138 |
| 5,873,775 A * | 2/1999 | Landahl et al. | 452/138 |
| 5,894,791 A * | 4/1999 | Rose et al. | 100/121 |
| 8,177,050 B2 * | 5/2012 | Matsuura et al. | 198/780 |
| 8,689,682 B2 * | 4/2014 | Rose et al. | 99/495 |
| 2012/0067702 A1 * | 3/2012 | Frey et al. | 198/642 |
| 2014/0061008 A1 * | 3/2014 | Haythornthwaite | 198/844.1 |

FOREIGN PATENT DOCUMENTS

| | | |
|---|---|---|
| EP | 0640290 A2 | 3/1995 |
| RU | 27869 U1 | 2/2003 |

OTHER PUBLICATIONS

Decsion to Grant issued Jan. 16, 2015 in RU Application No. 2013108349/13.

* cited by examiner

SEPARATING MACHINE AND METHOD

CROSS-REFERENCE TO RELATED APPLICATIONS

This application is a Section 371 of International Application No. PCT/EP2011/063359, filed Aug. 3, 2011, which was published in the English language on Feb. 9, 2012, under International Publication No. WO 2012/017002 A1 and the disclosure of which is incorporated herein by reference.

BACKGROUND OF THE INVENTION

The present invention concerns a separating machine for separating products of soft and harder consistency, including a drum which is drivable in rotation about its axis and the peripheral surface of which has a plurality of holes, and a pressing device which by means of a pressing element presses the product to be separated against the peripheral surface of the drum so that product components of soft consistency pass through the drum.

Separating machines of the general kind set forth are often used, in which the pressing element is in the form of an endless belt which partially extends around the drum so that the product to be separated is introduced into the gap between the drum and the endless belt.

Separating machines of the general kind set forth have proven their worth in principle. However there is a need for improvement in regard to present day uses. Thus, there is the endeavor to increase the throughput of the separating machines, for which purpose separating machines can be operated at higher power and/or at a higher operating speed of the pressing element, for example a higher speed of rotation of the pressing element or a higher speed of the endless belt used as the pressing element. A higher throughput, for example by virtue of a higher operating speed of the pressing devices, results however in more rapid wear of the endless belt, which can have the consequence that the product to be separated accumulates upstream of the drum to an increased degree, particularly when there are also larger pieces of the product to be separated. Those unwanted product accumulations result in the endless belt bulging out, which leads to irregular movement thereof and may possibly make it necessary to shut down the separating machine. That also loads the bearings of the drive, direction-changing and guide devices of the pressing belt, such bearings often being in the form of rolling members or rollers, by way of which the endless belt is guided or which support the endless belt. In addition such product accumulations can result in unwanted slippage of the belt with respect to the product to be separated and/or the drive element.

In addition, such irregular movements of the endless belt can result in deceleration thereof, which on the one hand is disadvantageous in regard to throughput through the separating machine, while on the other hand however that produces frictional heat and thus leads to an increased power consumption but also unwanted input of energy into the product to be separated which in most cases represents a foodstuffs product.

Such problems are not only limited to separating machines having a pressing belt as the pressing element, but to a certain extent can also occur for example when the pressing element is in the form of a pressing head arranged within the drum and rotating relative to the drum.

BRIEF SUMMARY OF THE INVENTION

An objective of a preferred embodiment of the present invention is to provide a separating machine which resolves the above-mentioned problems and which in particular leads to a longer service life for the machine and the pressing element and permits more uniform implementation of the separating process.

The above objective is attained by a separating machine in which there is provided a cooling device for cooling the pressing device, in particular the pressing element. It was surprisingly found that that results in substantially more uniform operation of the separating machine, particularly when the pressing element is adapted to be elastically deformable, more specifically being in the form of an elastic endless belt, without being only restricted thereto. In addition surprisingly the service life of the pressing element or endless belt is substantially increased in regard to a reduction in stiffness and/or strength thereof in operation. It was found in accordance with a preferred embodiment of the present invention that the fact of the belt bulging out is to be attributed to a reduction in the stiffness and/or strength thereof, wherein cooling of the belt increases the stiffness and/or strength thereof so that this substantially prevents the belt from bulging out, with an accumulation of product upstream of the drum (pocket formation). Fatigue of the belt with a reduction in strength is substantially delayed. That also results in more uniform implementation of the separating process and thus an increase in the length of the production cycles and a reduction in the maintenance intervals of the machine. Operating disturbances in operation of the separating machine are markedly reduced and the life of the belt substantially increased. That then also results in more uniform loading of the individual components of the separating machine which directly engage the pressing element such as the drive element, tensioning element, direction-changing rollers, lateral belt guide, support elements and so forth so that the service life of the separating machine is also overall increased.

In addition, the cooling device provided according to a preferred embodiment of the present invention cools the product to be separated which is fed to the drum and/or the pressing device when it passes into the working region of the separating machine, for example into a gap between the pressing device and the drum, which can narrow in the production direction. That provides for better preliminary conditioning. Temperature differences in the pressing element and thus also the product to be separated under different operating conditions of the separating machine are markedly reduced or eliminated, wherein the operating temperature of the pressing element has an influence on the temperature of the product to be separated, in particular on the portions of softer consistency thereof. Temperature fluctuations in the soft product to be separated off can be limited and thus it is possible to observe higher hygiene standards, in particular in regard to avoiding bacteriological multiplication. As was found in accordance with a preferred embodiment of the present invention that is substantially also due to the fact that a reduction in stiffness and/or strength of the belt leads to pocket formation and thus increased friction between the product and the pressing element and an increased input of energy into the product, and, independently thereof, that also leads to increased slippage of the belt with respect to the product to be separated and possibly also the drive roller. In that case, pocket formation and slippage can occur irregularly in respect of time, and also in respect of the amount thereof. In particular that pocket formation and unwanted slippage can be precisely avoided by the measure according to the invention, which leads to markedly more regular belt movement with markedly reduced belt acceleration and deceleration phenomena. That is, therefore, to be distinguished from a direct feed of a cooled product to be separated, to the separating machine, which would then result in greater difficulty in drawing in the product and passing it through the drum.

It was further found that the separating process can be more uniformly performed by virtue of the measure according to a preferred embodiment of the present invention as the product to be separated is fed to the pressing device or the drum at a more uniform temperature. That prevents the product to be separated being able to assume different temperatures in the operative region of the pressing device, for example in time periods of greater and lesser pocket formation, for example in dependence on the products to be separated (example when dealing with batches involving different properties such as piece size of the product to be separated) and/or the operating conditions of the separating machine, for example production speeds. Thus, for example, 'smearing' of products with a higher water and/or in particular fat content, for example cheese, meat with fatty components etc, is effectively prevented, which can be involved with separation of fat and/or water components and thus unwanted fouling and deposits in the separating machine. The separating machine can therefore be operated with extended maintenance intervals.

The measure according to a preferred embodiment of the present invention, namely providing a pressing device, in particular a pressing element, with a cooling device, has proven to be quite particularly advantageous if the pressing element is an elastic endless belt or an endless belt with at least an elastic surface. The endless belt is guided in circulation in the separating machine. The endless belt can extend around part of the periphery of the drum, that is to say it can be guided in an arcuate configuration around the drum. It has been found that surprisingly the service life of the pressing element and thus the pressing device overall can be substantially increased by the measure according to the invention. That applies, for example, even when the endless belt is already supported by a belt chain which preferably extends over the entire width of the belt, wherein the individual chain links can comprise a metal or another suitable material such as for example plastic. In contrast to the chain, in the case of the endless belt the individual belt portions (for example, of the order of magnitude of the chain links) are deformable and are also not connected hingedly but connected throughout by way of the material thereof in interconnecting relationship. Even when a support chain is additionally provided, the elastic endless belt is subjected to deformation phenomena and also loadings in the longitudinal direction of the belt, which are reduced according to a preferred embodiment of the present invention. Due to the cooling according to a preferred embodiment of the present invention which increases the strength/stiffness of the belt, however, it is also often possible to dispense with such a supporting link chain so that very expensive and complicated cleaning or dismantling of the chain for maintenance purposes is not required.

The endless belt can include a deformable material, in particular an elastically deformable material, including a composite material which can have layers of differing strength, for example tensile and/or tearing strength. The surface or the layers near the surface of the belt or the belt overall can comprise a plastic material, for example a polyurethane material or a natural or synthetic rubber. The drum-side surface of the belt is preferably in each case a continuous surface, through which no product of soft consistency can penetrate during the separating process and/or which is continuously covered with the deformable (in particular elastically deformable) material. The belt can in particular have an intermediate layer which affords tensile strength in the longitudinal direction thereof. That tensile-strength layer can have a tensile carrier, for example in the form of cables of metal or other tensile-strength materials, including plastic material, a textile material, a fabric layer, e.g., including a textile material, for example a metallic material or plastic or the like. In general, the tensile strength of the intermediate layer and of the whole belt may be higher in the longitudinal direction of the belt than in the transversal direction, e.g., means of the arrangement or tensile strength of the tensile carrier material in the longitudinal and in the transversal direction. The tensile-strength layer is covered at the top side, optionally at the top side and the underside, with a deformable material, preferably an elastically deformable material. The 'top side' of the endless belt is the side towards the drum through which product components of soft consistency pass. The tensile-strength layer can be of a layer thickness of 1-7 mm, preferably 1-5 mm. The top-side cover layer as part of the endless belt can be of a layer thickness of 0.5-15 mm, preferably 1-10 mm. The cover layer is preferably of a Shore A-hardness in the range of 45-100 Shore A, preferably 50-95 Shore A, particularly preferably 60-80 Shore A.

A further functional layer can be arranged above the cover layer, for example a wear layer, wherein this further functional layer may be the top layer of the endless belt. The hardness and/or wearing resistance of the functional layer, especially as a wear layer, might be higher than that of the cover layer. Especially, the functional cover layer (e.g. as a wear layer) is preferably of a Shore A-hardness in the range of 60-120 Shore A, preferably 70-110 Shore A, particularly preferably 80-100 Shore A, in general most preferred that the hardness of the functional layer is higher than the hardness of the cover layer. The thickness of the further functional layer (e.g. as a wear layer) can be 1-6 mm or 1.5-5 mm, preferably 2-4 mm, especially about 3 mm. The thickness of the functional layer (e.g. as a wear layer) preferably is less than the thickness of the cover layer, in certain cases it may be larger than the thickness of the cover layer. In special cases the thickness of the functional layer may be ≤0.5-1 mm. in general the functional layer (e.g. wear layer) may be made of an elastic material, especially a rubber material, most preferred a PU (polyurethane) rubber.

The layer arranged beneath the tensile-strength layer, of deformable and in particular elastically deformable material can be of a layer thickness of 0.5-15 mm, preferably 1-10 mm, particularly preferably 2-6 mm. The layer arranged beneath the tensile-strength layer can have a Shore A-hardness in the range of 45-100 Shore A, preferably 50-95 Shore A, particularly preferably 60-90 Shore. Layers arranged above and beneath the tensile-strength layer and comprising elastic, preferably elastically deformable material can be formed integrally one on the other and can possibly also be in the form of separate layers, particularly if the tensile-strength layer is a fabric layer.

The life span or service life of the deformable pressing belt is substantially increased by the measure according to a preferred embodiment of the present invention and therewith also the service life of the pressing element and the separating machine overall. The advantage according to a preferred embodiment of the present invention is attributed to the fact that cooling of the pressing belt during operation of the separating machine, in particular in the medium or higher load range of the separating machine, provides that it has a higher degree of stiffness or strength, in relation to an uncooled belt. Unwanted pocket formation in the pressing region of the belt against the drum by virtue of accumulations of the product to be separated between the pressing belt and the drum occurs only after markedly longer operating times. The above-described advantages are then afforded in particular with that design configuration.

The endless belt can be moved in a circulatory movement at a belt speed of 5 m/min to 150 m/min, for example at a belt speed of 5 to 100 m/min or 10 to 70 m/min.

The holes or through openings in the drum, through which the product components of soft consistency are passed, can be of a width in the range of 0.1-30 mm, preferably 0.5-30 mm, particularly preferably 0.75-25 mm or 1-20 mm. The holes are preferably round holes or have a curved shaped rim, e.g. eclipse rim, they can possibly be of a different shape. The drum (apertured drum) is also referred to hereinafter synonymously as the 'sieve drum'.

In a preferred embodiment of the present invention, the pressing element is in the form of an endless belt, preferably an elastically deformable belt, which partially extends around the drum, wherein the belt can be pressed against the drum by means of at least one pressure application device. The pressure application device can be for example in the form of a pressure application roller which is arranged on the side of the belt, that is opposite to the drum. The pressure application device or roller is thus preferably arranged directly opposite the drum. In a particularly preferred embodiment of the present invention, the pressure application device, in particular in the form of a pressure application roller opposite the sieve drum, is provided with a cooling device (variant 1).

Alternatively or additionally to the above-described variant 1, in accordance with variant 2 the endless belt can be driven by at least one drive element, wherein according to a preferred embodiment of the present invention the drive element can be provided with a cooling device to cool the endless belt by cooling of the drive element. Particularly preferably the pressure application device at the same time includes the drive element for the endless belt, for example the pressure application roller around which the belt is guided is at the same time a drive roller for the endless belt.

Alternatively or additionally to the two above-mentioned variants 1 and 2, in accordance with variant 3 the endless belt can be guided around at least one direction-changing device, wherein according to a preferred embodiment of the present invention the direction-changing device is provided with a cooling device so that the endless belt can be cooled by cooling the direction-changing device. The cooled direction-changing device can for example have at least one or more direction-changing elements, for example rollers, wherein one, more or all of the direction-changing elements can be provided with a cooling device. In particular the direction-changing device can at the same time be a tensioning device, for example in the form of a tensioning roller, by which the pressure application belt can be tensioned to urge the product to be separated in the gap between the belt and the sieve drum against the sieve drum.

Preferably, at least one cooling element bears in heat-dissipating relationship against the pressing element, wherein the pressing element can be in the form of an endless belt and the cooling element can particularly preferably be in the form of a roller. In general, during implementation of the separating process, the cooling element can have a cooling surface which bears against the endless belt in heat-transferring relationship and which bears against the pressing element preferably over an area or possibly also only in linear relationship. Preferably, the cooling element is movable, for example rotatable, preferably in such a way that the pressing element is moved non-slippingly with respect to the cooling element, for example by the two components rotating in opposite directions relative to each other.

In a preferred embodiment of the present invention, the pressing element is in the form of an endless belt, preferably an elastically deformable belt, which partially extends around the drum. The belt is preferably pressed against the drum by means of at least one pressure application device or can be pressed against the drum (having regard to the fact that the harder components of the product to be separated, which do not pass through the drum, in the gap between the belt and the drum, leave the gap). The pressure application device can be for example in the form of a roller arranged on the side of the belt opposite to the drum. The pressure application device or roller is therefore preferably arranged directly opposite the drum. The belt can be deflected around the pressure application roller, in particular in such a way that the pressure application roller can define one of the two end regions of the peripherally extending configuration of the belt, and the pressure application roller can possibly also be arranged between the two end regions of the peripherally extending configuration of the belt.

In a particularly preferred embodiment of the present invention, the pressure application device, in particular in the form of a pressure application roller opposite the sieve drum, is provided with a cooling device for cooling the pressing element or the pressure application belt (variant 1).

Alternatively or additionally to variant 1, in accordance with variant 2 the pressing element or endless belt can be driven by at least one drive element, wherein according to a preferred embodiment of the present invention the drive element can be provided with a cooling device to cool the pressing element or endless belt by virtue of cooling of the drive element. Particularly preferably, the pressure application device at the same time includes the drive element for the pressing element or endless belt, for example the pressure application roller around which the belt is guided is at the same time a drive roller for the endless belt.

The endless belt can be guided around at least one direction-changing device which can be arranged between the maximally spaced end regions of the belt, which cause a reversal in direction.

Alternatively or additionally to variants 1 and 2, according to a preferred embodiment of the present invention in accordance with variant 3 at least one direction-changing device of the belt can be provided with a cooling device so that the endless belt can be cooled by cooling the direction-changing device. The cooled direction-changing device can have for example at least one or more direction-changing elements, for example rollers, around which the belt is deflected with a change in direction, wherein one, more or all of the direction-changing elements can be provided with a cooling device.

In particular the direction-changing device can be at the same time a tensioning device, for example in the form of a tensioning roller, by which the pressure application belt can be tensioned in the longitudinal direction in order to urge the product to be separated against the sieve drum in the gap between the belt and the sieve drum and to counteract the endless belt in terms of bulging out.

In general the tensioning device can form an end region of the peripherally extending configuration of the belt, around which the belt is returned. The belt is preferably passed around the tensioning element or the tensioning roller through more than 90-120°, preferably more than 150-180°, particularly preferably more than 200-210°. Alternatively or additionally the belt is passed around the pressing roller or the drive element respectively through more than 90-120°, preferably more than 150-180°, particularly preferably more than 200-210°.

If the end regions in which the belt changes direction extend around the direction-changing device through more than 20-30°, or more than 40-50°, preferably more than 60-90° or more than 120-135°, then in accordance with the invention the direction-changing element can be equipped with a cooling means for cooling the pressing element.

Preferably, the cooling element is arranged in the roller of the belt guide, which has the greatest contact region with the belt, which is preferably the roller of the largest diameter of the belt guide (that is to say the arrangement of the guide elements, which define the belt movement configuration). That can be a roller which deflects a lateral end region of the belt.

The separating machine can have a tensioning device, by means of which the endless belt is tensioned in the region of the gap between the belt and the sieve drum, in which the product to be separated is urged through the sieve drum. The tensioning device can be variable in position or can have a tensioning element which is variable in position in order to alter the tensioning of the pressure application belt by the change in position of that element. The tensioning device, in particular in the form of a tensioning roller, around which the endless belt is guided, can form an end region of the belt peripheral configuration so that the belt is returned around the tensioning device, wherein the belt extends between a first and a second end region. The tensioning device can be arranged on the side of the endless belt, opposite to the pressing device, so that at one end the endless belt is guided around the pressing roller and at the opposite end it is guided around the tensioning device or roller. In that case the endless belt can be of a V-shaped or U-shaped arrangement, wherein the pressure application and tensioning devices provide the end regions of the belt peripheral configuration and the drum is arranged in the depression of the V-shaped or U-shaped profile.

The tensioning device can act on the endless belt with a tensioning force in the range of 20 to 5000 kg, for example in the range of 50 to 2500 kg or 100 to 1000 kg.

Independently of or additionally to variants 1 to 3, according to a preferred embodiment of the present invention, in variant 4 the tensioning device can be provided with a cooling device to cool by means thereof the tensioning device and therewith the pressure application belt. The tensioning device can generally be in the form of a roller or direction-changing roller member. As the tensioning device has a relatively large contact region with the belt that permits effective cooling of the belt.

The separating machine can have a lateral guide device for the endless belt, for example in the form of guide plates or rollers arranged laterally of the belt, which restrict the sideways movement of the belt and which bear temporarily or preferably permanently against the endless belt at the sides thereof during the circulating movement of the endless belt.

Alternatively or additionally to variants 1 to 4, in accordance with variant 5 a lateral guide device can be provided with a cooling means to be able to cool the pressing device or pressing element.

Alternatively or additionally to the foregoing variants of the present invention, in accordance with a further variant 6 there can be provided a cooling section having at least one or more cooling elements, by which the endless belt is cooled. In the region of that cooling section the endless belt can be guided at least substantially in a straight line without a change in direction. The cooling section can thus be arranged between two direction-changing regions of the belt. The cooling section can have a cooling element which bears in areal contact against the pressing element, for example in the form of an endless belt.

The separating machine can have at least one support device preferably including 1, 2 or more support elements which support the endless belt at the underside. The support device can be in the form of one or more support rollers, alternatively or additionally also in the form of a support chain such as for example a link chain against which the elastically deformable endless belt bears and which can support the endless belt over a longer region. The support device can be provided respectively in the region of the gap in which the product to be separated is pressed against the apertured drum in order to separate off parts of soft consistency of the product. The support device can be provided in particular in the region that is downstream in the production direction of the gap between the endless belt and the drum. The support device preferably extends over the entire width of the endless belt or drum.

Alternatively or additionally to the foregoing variants of the present invention, in accordance with a variant 7 there can be provided at least one support device which according to the invention is equipped with a cooling device for cooling the pressing element or endless belt.

In general, the apertured drum can also be equipped with a cooling means, but it is optionally possible also to dispense with such a cooling means, whereby dismantling of the apertured drum for cleaning or maintenance purposes is facilitated.

Particularly preferred is a combination of alternatives 1 and 3 whereby the pressure application device and the tensioning device are provided in combination with a cooling means, in particular as that configuration in the form of rollers are of a comparatively large diameter so as to permit effective cooling of the endless belt.

Optionally in addition to cooling of the pressing device and/or the tensioning device, there can be provided a separate cooling section for the endless belt, through which the endless belt is passed at least substantially in a straight line.

Particularly preferably the cooling device is so designed that the coolant is guided in a closed circuit. That provides on the one hand for effective use of the coolant while on the other hand that provides that the product to be separated does not come into contact with the coolant, whereby even high hygiene demands can be met. Optionally, alternatively or additionally it is also possible to provide an open cooling circuit to cool various elements of the pressure application device.

The coolant can generally be a fluid, in particular liquid coolant. The coolant temperature can be ≤0 to −5° C., preferably ≤−10 to −20° C., optionally even ≤−25 to −30° C. The coolant temperature can be in the range of 0 to −50° C., preferably in the range of −5 to −40° C. or down to −30° C.

The cooling device can be, for example, so designed that a fluid cooling medium is fed to a device in contact with the pressing device, in particular the pressure application belt. At least one or more elements of the pressing device are preferably directly cooled by the coolant, in particular belt guide means or rollers directly in contact with the endless belt. If the respective device is in the form of a roller the core of the roller can be cooled or the roller can be provided with cooling elements such as for example coolant passages which pass through the roller in radially spaced relationship from the axis, preferably in a region of the roller, that is near the surface.

Preferably, the cooling device of the separating machine is or can be set in such a way that the pressing device, in particular the pressing element thereof, more specifically in the form of an endless belt, is cooled to a temperature of ≤30 to 40° C., thereby already significantly achieving the effects according to a preferred embodiment of the present invention. That can relate in particular to the surface of the pressing element which is towards the product to be separated and which urges the product through the drum. In particular the temperature can be set or settable to ≤20 to 25° C. or ≤10 to 15° C. or optionally also ≤3 to 5° C., in particular also to temperatures of ≤0 to −5° C. or ≤−10 to −15° C. The specified temperature preferably relates in each case to the operating temperature when the separating machine is running, for example when the separating machine is operating at medium load or at maximum load. The medium load corresponds in that case to half the power consumption of the separating machine in relation to the maximum load at which the separating machine can run in continuous service in accordance with its specifications. Continuous operation can occur when the separating machine is operated continuously at at least the same load for ≥0.5-1 hour or ≥3-6 hours, in particular also ≥10-16 hours. With such a period of time the system is in a condition of thermal equilibrium.

For many situations of use it has proven to be particularly advantageous if the cooling device is or can be set in such a way that the pressing element or the surface thereof, under continuous load of the separating machine, is cooled to a temperature of −20 to 20° C. or −15 to 15° C., preferably −10 to 20° C. or −10 to 10° C., particularly preferably in the range of −5 to 5° C. On the one hand that provides a significant improvement in the strength of an elastically deformable belt as the pressing element, while on the other hand it is possible to meet high hygiene demands, wherein moreover the product to be separated of soft consistency no longer acquires an excessively firm consistency, by virtue of an excessive reduction in temperature.

Furthermore, preferably the cooling device is or can be set in such a way that no adhesions of the product to be separated to the pressing device or the pressing element are formed in operation of the separating machine. That can apply in particular at medium or maximum cooling effect of the cooling device. Excessively low temperatures at which therefore so-to-speak the product to be separated freezes on the pressing element are avoided thereby. At the same time that affords optimum hygiene, in particular in relation to unwanted multiplication of bacteria, and maximum strength of the pressing element with a deformable or elastically deformable surface which comes into contact with the product to be separated. Here too the temperature relates to operation of the separating machine, preferably under constant load, as described hereinbefore. The surface temperature of the pressing element can in that case be maintained by means of the cooling device at temperatures in the range of up to −10° C. or −5 to −3° C. or −2 to 0° C. (in the sense that lower temperatures are avoided) or such that the temperature does not fall below +5 or +3° C.

The above-mentioned temperature specifications can relate in each case to operation of the separating machine, in particular under medium load or maximum load, in each case also in relation to the above-indicated periods of ≥0.5-1 hour or ≥2-3 hours, optionally ≥4-6 hours.

In addition, the cooling device is or can be set in such a way that the product to be separated (or the component of soft consistency thereof), after passing through the drum, is at least substantially at the same temperature as prior to the feed to the pressing device or upon the feed to the separating machine, which in each case can be determined at the entry into the pressing device or the entry into the separating machine. 'Substantially the same temperature' can possibly also mean that the temperature of the product component of soft consistency, after passing through the drum, can be lower than the temperature of the product to be separated upon passing into the pressing device or the separating machine. For example, there can be a temperature difference of ≥10–15° C., ≥5-7.5° C., or ≤2-3° C., between the two, possibly also ≤0.5-1° C. In that way it is possible to meet particularly high hygiene demands when carrying out the separation process.

In accordance with a further particularly preferred embodiment of the present invention, there can be provided a temperature regulating device for regulating the temperature of the pressing element, by means of which the product to be separated or the product component of soft consistency to be separated are held at least substantially at a predetermined target temperature. Upon fluctuations in process parameters such as for example a differing load on the separating machine, differing product throughput and/or a variation in the nature of the product to be separated (for example in regard to the piece size), it is possible to observe constant hygiene conditions. In addition the stoppage time of the machine can also be minimized thereby, as for example maintaining a target value range for the temperature makes it possible to ensure that unwanted separation of the product to be separated, for example separation of an aqueous phase or a fat phase, is avoided. Fouling and contamination of the separating machine, which would lead to stoppage times for cleaning the machine, can be reduced thereby. At the same time, by virtue of the temperature being kept constant, a deformable pressing element, in particular an elastically deformable pressing element, is exposed to precisely defined loadings so that the service life of the pressing element can be more accurately determined. Preferably, the cooling device is so regulated that heating of the product within the separating machine or of the product component of soft consistency to be separated off deviates from a predetermined target value by a maximum of ±5 to 10° C., preferably ±2 to 3° C., particularly preferably ±0.5 to 1° C. That can also relate in each case to the temperature of the pressing element surface (on the side towards the product to be separated).

A suitable control or regulation can be provided to maintain the target temperature or the specified temperature differences, wherein temperature sensors can be provided for detecting the temperatures of the respective parameters at suitable locations. In particular, temperature detection can be effected at the surface of the pressing element, for example by a temperature sensor contacting the pressing element surface or at components which bear directly against the endless belt such as the pressure application roller, tensioning roller, direction-changing roller and so forth. Optionally the temperature of the apertured drum, through which the product components of soft consistency pass, can be monitored by means of a temperature sensor. For example, temperature control/regulation of the respective machine component can be effected. In the simplest case it is also possible to provide for temperature control/regulation of the coolant, for example to a predetermined constant temperature. Alternatively or additionally, the temperature of the product component of soft consistency, which has passed through the drum, can be measured and regulated, for example by a temperature sensor projecting into the product of soft consistency that is to be separated. Optionally the temperature of a reference element which is in heat-conducting contact with the pressing element can be used to check the target value, in that case the contact is preferably a body-to-body contact. For example, for that purpose it is possible to determine and regulate the surface of an element of the pressing device, which is in body-to-body contact with the pressing element, for example the drive element, tensioning element, a direction-changing element and/or a support element of the pressing element.

In addition the separating machine can be provided with an alarm device which displays a deviation of the measured temperature of the element (above and/or below a specified value), which is used for temperature monitoring of the product to be separated and/or the product component of soft consistency that is to be separated, for example also a deviation in the target temperature of the pressing element. When the temperature rises above or falls below the target temperature or the target temperature range an alarm function is triggered, for example an optical and/or acoustic alarm function, and possibly also shut-down of the separating machine.

It has proven to be advantageous if the cooling device or the coolant production device associated therewith has a cooling power of at least 0.1 to 0.2 kW, preferably ≥0.3 to 0.5 kW or ≥0.75 to 1 kW. The cooling power can be for example up to 4 kW or up to 6 or up to 8 kW, for example even up to 10-15 kW or up to 20-25 kW or beyond.

If a plurality of elements of the separating machine are cooled they can be connected to separate cooling circuits or preferably to the same cooling circuit. The individual cooling circuits or the one cooling circuit can be connected to a coolant production device.

Cooling of the pressing device or the pressing element can be connected to an internal cooling circuit of the separating machine, which can optionally be provided for cooling other machine parts of the separating machine, or to a cooling circuit to which other machines are/can be connected. The waste heat carried away by way of the cooling circuit can be provided by a suitable heat exchange device for industrial water heating of the respective operating location or other machines provided there.

The product to be separated is preferably introduced into a gap between the pressing device or endless belt and the drum, the gap narrowing in the production direction. In this case the gap is defined on the one hand by a constriction region B at which the endless belt comes into contact (in case the product parts of harder consistency passes the constriction region B between the endless belt and the drum, the belt may be spaced from the rum in some regions where the harder components are arranged but may be in contact with the drum in regions of the belt where there is no harder component passing the constriction region) or almost comes into contact with the peripheral surface of the sieve drum (e.g. spaced by harder consistency components passing the constriction region B), and is therefore at the smallest spacing in relation thereto. The endless belt is biased with a certain power against the drum and preferably only is not in contact with drum in regions where hard component material is passing the constrictions region and therefore is arranged between the endless belt and the drum. The product components of harder consistency from which the product components of soft consistency are removed are carried away from the gap outlet. The gap then widens towards the gap inlet, wherein the endless belt is passed at least over a partial region or over the entire longitudinal extent of the enlarging gap around the drum (sieve drum) preferably in an arcuate configuration, more specifically with a smaller curvature than the curvature of the peripheral surface of the drum. In the region of the gap inlet, there is a reference point P which is arranged on the surface of the endless belt and at which a line perpendicular to the belt surface bears tangentially against the peripheral surface of the sieve drum. The reference point P can at the same time represent the turning point in the change in direction of the endless belt, wherein the region of the belt, that is arranged towards the gap constriction, is curved convexly in relation to the concavely curved peripheral surface of the sieve drum and the region of the endless belt, that is further away from the reference point P, is also curved concavely. A location point T is defined on the drum by the above-mentioned tangent. In that respect it has been found to be particularly preferred if the endless belt extends around the drum by ≥90-100°, preferably ≥110-120°, particularly preferably ≥140-160°, for example about 180°, between the constriction region B and the tangential point T. Preferably the endless belt is curved in the same direction in that region. It has been found at least sufficient if the endless belt extends around the drum through ≤250-270°, in particular ≤210-230°, possibly also ≤90-200°, between the constriction region B and the tangential point T.

Throughput levels in respect of the product to be separated can be achieved with the separating machine according to the invention, of ≥100 to 200 kg/hour or ≥500 to 1000 kg/hour or 2000 to 4000 kg/hour, for example up to 5000 to 10,000 kg/hour or 20,000 to 25,000 kg/hour or beyond.

The product to be separated by means of the separating machine can generally be or can include (comprise) a foodstuff, in particular a fresh foodstuff, for example meat, which is to be separated from gristle and/or bone, fish which is to be separated from skin and/or fish bones, foodstuffs which are to be separated from their packaging or casing (packaging as the product component of hard consistency, for example cheese and/or meat/sausage goods to be separated from their packaging), wherein the packaging can be for example a foil, the casing can be a sausage skin, a skin or the like. In general a part of the foodstuff material is that material which is passing the drum. The invention also embraces in each case a separating machine loaded with the aforementioned foodstuffs or with a material comprising foodstuff. In general, a preferred embodiment of the present invention covers a separating machine having a drum with holes, the holes being adapted so that the foodstuff or foodstuff comprising material the separating machine is loaded with can pass the holes of the drums, especially under enforcement of the endless belt biased against the drum. Under the term "foodstuff" also foodstuff waste is covered, especially material which has been a foodstuff but cannot be used as a foodstuff, e.g., be run off of the expiration date, contamination with external materials like polluted or unclean materials, rendering the foodstuff out of use as a foodstuff. The term "foodstuff" especially is directed to human foodstuff but also may include animal foodstuff (originally adapted to feed animals, including animal foodstuff waste). In general, the material passing the drum may be biodegradable material, A preferred embodiment of the present invention further concerns a method of separating products of hard and softer consistency by means of a separating machine. According to a preferred embodiment of the present invention, the pressing device, in particular the pressing element, is cooled by means of a cooling device during operation of the separating machine. Preferably the pressing element is in the form of an endless belt. Preferably the pressing element has at least an elastic surface or comprises an elastic material, including composite material.

In particular, the method according to a preferred embodiment of the present invention can use a separating machine as is described generally in accordance with the present invention. In particular, the pressing device or the pressing element can be cooled to temperatures, as specified hereinbefore. It is particularly preferred, for carrying out the method, to use a machine having an alarm device which is operated in such a way that, upon a deviation in the temperature of the pressing device, in particular the pressing element, and/or the separated product of soft consistency and/or the product of hard consistency, from a given target value, an alarm is triggered. The target value can also be implemented as a target value interval, wherein when an upper target value is exceeded and/or when the value falls below a lower target value, an alarm is triggered or the separating machine is stopped.

Particularly preferably the method involves using a separating machine in which the pressing device is in the form of an endless belt which extends around the drum over part of its periphery, providing a gap between the drum and the surface of the endless belt that is theretowards, the gap narrowing in a direction towards the drum. In that case the gap has a constriction region B, wherein with given guidance for the endless belt, a line perpendicular to the surface of the endless belt bears against the peripheral surface of the drum with a tangent at the tangential point T. The endless belt preferably extends curvedly around the drum so that an angular range ≥110° or ≥140° and preferably ≤270° or ≤230° is included between the constriction region B and the tangential point T on the drum. In that way, a sufficient pressure force can be exerted on the product to be separated by virtue of the continuous narrowing of the gap so that, even at a high production speed, soft product components can pass through the drum through the holes in the peripheral surface thereof.

Particularly preferably, the separating method is carried out by means of a separating machine in which there is provided a control or regulating circuit for controlling or regulating the temperature of the pressing device, in particular the pressing element, to a predetermined target value, and such control or regulation is carried out. Control or regulation can be effected in such a way that deviations from a predetermined target value of ≤±5-10° C. or ≤±2 to 3° or ≤0.5 to 1° C. are observed.

In particular, the method is performed in respect of products to be separated in the form of foodstuffs, wherein the foodstuffs can be for example meat, sausage, fish or cheese goods. Reference is explicitly directed to the foregoing description.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
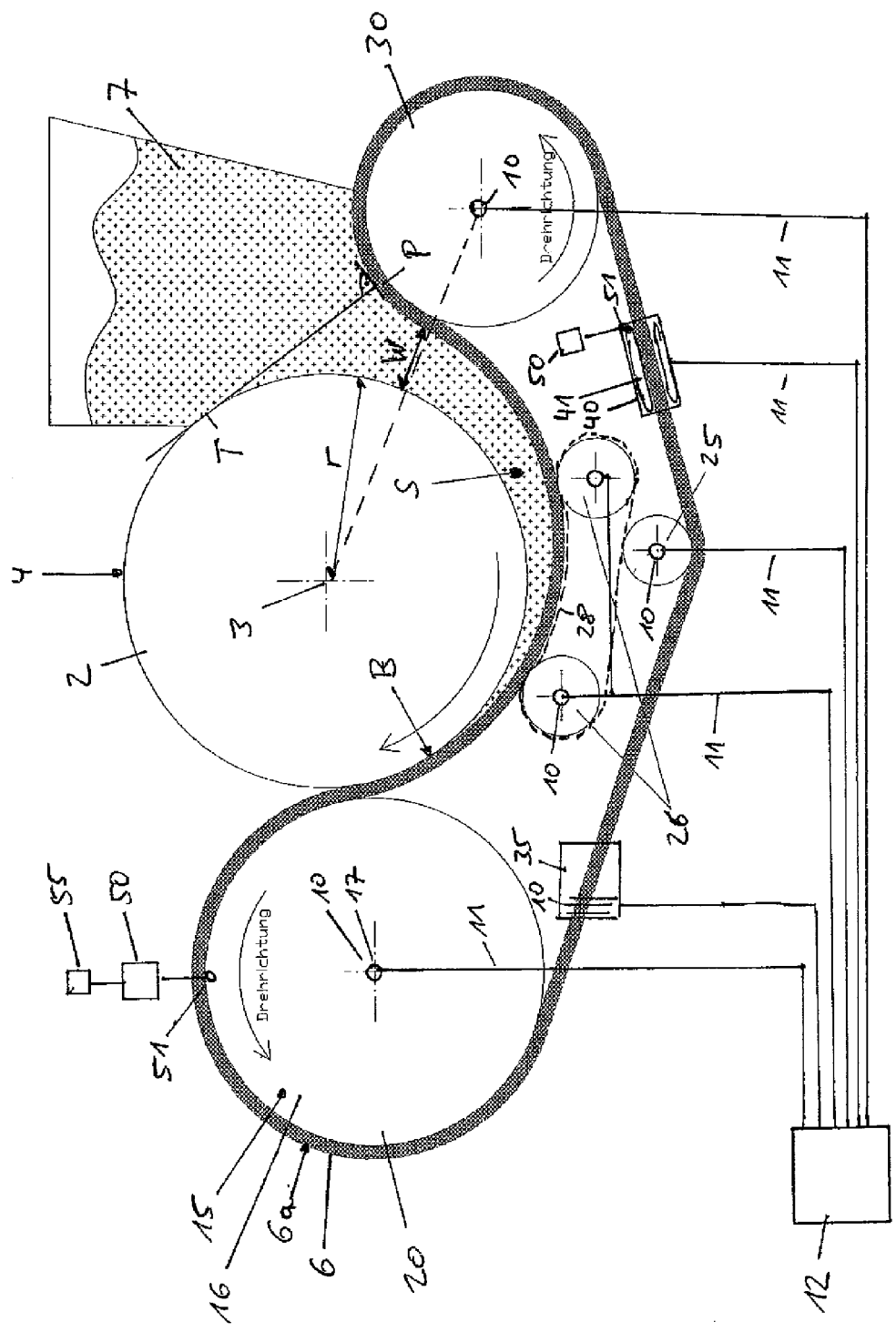
FIG. 1 shows a diagrammatic side view of a separating machine according a preferred embodiment of the present invention.

Certain terminology is used in the following description for convenience only and is not limiting. The words "right," "left," "lower," "upper" and "top" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIG. 1 shows a separating machine 1 according to a preferred embodiment of the present invention for separating products of soft and harder consistency. The separating machine has a drum 2 which is drivable in rotation about an axis 3 and the peripheral surface 4 of which has a plurality of holes, for example in the form of a sieve drum. The hole diameter is here 3 mm. In addition there is a pressing device 5 which by means of a pressing element 6 presses the product 7 to be separated against the peripheral surface 4 of the drum 2 so that product components of soft consistency pass through the drum 2 and are separated from product components of harder consistency. The pressing element can be in particular in the form of an endless belt which extends around the drum 2 over part of the periphery thereof. The product to be separated can be in particular a foodstuffs product, for example a meat, sausage, fish or cheese item, e.g., including foodstuff waste materials. The product of harder consistency can be in that case a material like gristle, bone, fish bones or generally also packaging materials such as plastic films which enclose the respective products.

According to a preferred embodiment of the present invention, the separating machine 1 is provided with a cooling device 10 for cooling the pressing device, in particular for cooling the pressing element 6. The pressing element 6 or the drum-side surface 6a can be cooled by means of the cooling device 10 so that the temperature or surface temperature of the pressing element can be controlled in particular in operation of the separating machine. In that way, according to a preferred embodiment of the present invention, the service life of the pressing element can be substantially prolonged, particularly when the pressing element overall or at least in its surface layer 6a comprises a deformable material or elastically deformable material, such as, for example, an elastomer like a rubber material (the material can generally also be a composite material which for example includes layers of higher strength). The surface layer 6a with the deformable or elastomer material can be arranged in particular on the surface side 6a, that is towards the drum 2 or the product 7, and which thus works against the drum. Because the pressing element or elastically deformable endless belt is cooled, it has a higher level of strength under conditions of use and in addition is thereby subjected to lesser material fatigue. As a result the product 7 can also be pressed with a uniform force against the drum over long separating machine operating times. The higher level of strength markedly reduces pocket-shaped bulging-out of the belt, with product accumulations therein, particularly even when coarser pieces of the respective product which cannot so easily pass through the drum 2 are disposed in the pressing region 5a of the pressing device 5 such as for example in the narrowing gap between the sieve drum and the endless belt. Such pocket formation, however, results in unwanted irregularities in operation of the separating machine, which cause increased unwanted input of energy into the product or ultimately necessitate stopping the machine. Such disadvantages are greatly reduced by the cooling device used according to the invention. In addition the cooling device also ensures that the separation method is carried out under very high hygiene demand levels.

The separating machine 1 can have a pressure application device 15, in particular in the form of a pressure application roller 16, by means of which the pressing element can be pressed against the drum (apart from separated product portions of harder consistency which leave the operative region of the pressing device between the pressing element and the drum, for example the gap which narrows in the production direction, between the endless belt and the drum). According to a preferred embodiment of the present invention, the pressure application device 15 can be provided with the cooling device 10, diagrammatically shown in FIG. 1 by coolant passages 11 which cool the shaft 17 of the roller 16 and for that purpose can pass through the shaft. The coolant is produced in the cooling device or the cooling medium is cooled to its operating temperature.

In accordance with a preferred embodiment of the present invention, alternatively or additionally, the pressing element, in particular in the form of an elastic endless belt, is driven by at least one drive element 20. The drive element 20 can be different from the pressure application device, in accordance with the illustrated preferred embodiment. The pressure application device serves at the same time as a drive element. In the illustrated embodiment, therefore, the drive element is in the form of a roller around which the endless belt at least partially passes. Preferably, the endless belt passes around the drive element through more than 120 degrees or more than 180 degrees, which can generally apply in accordance with the invention. Cooling can be effected like also the cooling of the pressure application element or roller.

The endless belt can be passed around at least one direction-changing device 25, which here can be in the form of a direction-changing roller. The endless belt can be diverted around the direction-changing device through more than ≥20 to 30 degrees, preferably 180 degrees or more. Alternatively or additionally to the arrangement of a cooling device at the drive device, the direction-changing device can be equipped with a cooling device 10 for cooling the pressing element. Cooling can be implemented like also the cooling of the pressure application element or roller. Possibly all of the three elements of the direction-changing device, the pressure application device and the drive element can also be provided with a cooling device.

In a corresponding fashion a support device 26 for supporting the pressing element or endless belt can be provided in the pressing region 5a, which can have at least one cooling element 10. A plurality of elements of the pressing device, for example a plurality of rollers of the support device or a plurality of other direction-changing elements (for example in the form of rollers) can also be connected to a peripherally extending cooling device 28 which can bear in areal contact against the endless belt 6 and which in turn can be in the form of an endless belt. The heat exchange surface area can be enlarged thereby.

The endless belt can be passed around at least one tensioning device 30 for tensioning the belt, which here is in the form of a roller which is variable in position to set the tensioning force on the belt. The endless belt can be deflected around the tensioning device through more than ≥20 to 30 degrees, preferably 180 degrees or more. The tensioning device and the pressure application device can define the end regions of the belt peripheral configuration where it extends around the drum (right-hand/left-hand limits). The drum can be arranged between the end regions, in that region the belt can hang down. Alternatively or additionally to an arrangement of a cooling device at the pressure application device the tensioning device can be provided with a cooling device 10 for cooling the pressing element. Cooling can be effected like also the cooling of the pressure application element or roller. Possibly also all of the three elements of the direction-changing device, pressure application device and tensioning device can be provided with a cooling device.

In accordance with a preferred embodiment of the present invention, the separating machine can be equipped with a lateral guide 35 for the endless belt, which preferably during operation of the separating device bears permanently or possibly also only temporarily in heat-transferring relationship against the pressing element. In the simplest case the guide device can be for example in the form of lateral guide plates, lateral guide rollers or the like. They can be provided with coolant passages and connected to a cooling device 10.

In accordance with a preferred embodiment of the present invention, cooling devices 10 can generally be connected to one or more elements of the pressing device in coolant-conducting relationship, which are preferably directly in body-to-body contact with the pressing element. The cooling devices can be connected to one or more coolant circuits which are connected in coolant-conducting relationship to a coolant production device 12.

In addition, there can be provided a cooling section 40 having at least one or more cooling elements 41, by which the endless belt is cooled. The cooling section represents an additional device and can bear against the pressing element or the endless belt and/or can directly cool the pressing element. That cooling device can be arranged for example between two direction-changing regions of the endless belt so that the endless belt is guided linearly or only with a slight change in angle of for example ≤30 to 45 degrees or ≤10 to 20 degrees or ≤5 to 10 degrees, possibly also ≤2 to 3 degrees, through the cooling device.

The cooling devices 10 and/or 40 can have contact elements which are in body-to-body contact with the pressing element, for example in the form of cooling rollers, cooling plates or the like, along which the endless belt is preferably guided in a condition of bearing thereagainst in areal contact. Heat dissipation from the pressing element to the cooling device is thus preferably effected by conduction. Optionally cooling can also be effected by means of a gaseous coolant flow with which the pressing element is acted upon, for example in the form of cold air flowing to the pressing element.

The fluid cooling medium, for example cold water, is guided by way of coolant lines 11 in a closed circuit between the coolant production device 12 and the at least one cooled element of the separating machine, serving for cooling the pressing element. It will be appreciated that a plurality of cooled elements of the separating machine can be connected to the same cooling device.

The cooling device in the illustrated embodiment can preferably be so set and the separating method performed by means of the separating machine can be so carried out that a component part of the pressing device, in particular the pressing element, is set to a temperature of preferably ≤20 to 25° C. or ≤10 to 15° C. Cooling can be settable or can be set when carrying out the method in such a way that the pressing element involves a temperature in the range of −10 to 10° C. or −5 to 5° C. Preferably the cooling device is or can be set in such a way that there is no product adhering to the pressing device in operation of the separating machine, for example due to product pieces freezing to the pressing element. The specified temperature of the pressing device can relate in each case in particular to the temperature of the drum-side surface of the pressing element. The specified temperature can further relate to the operating condition of the separating machine, for example in continuous load operation.

In the illustrated embodiment, there is provided a cooling device or coolant production device having a coolant power of about 3 kW.

In the illustrated embodiment, the drum by which the product components of soft consistency are separated off is not provided with a cooling device so that the drum is easily replaceable and is easy to clean. Optionally the drum can also be cooled or can be connected to a cooling device, in particular the cooling device for cooling the pressing device.

In the illustrated embodiment or generally in accordance with the present invention, there is further provided a (common) control device 50 for controlling the temperature of the pressing device or the pressing element, in particular the surface of the pressing element. The control device 50 can also include a temperature regulating device so designed that regulation of the temperature of the pressing device or the pressing element, in particular the surface thereof, can be effected. The said surface of the pressing element is preferably the surface towards the drum. Temperature control or regulation can be effected in such a way that the temperature can differ from a predetermined target value within a defined temperature range. In particular temperature regulation or control can be so effected or so set that the temperature deviation is ≤5 to 10° C. or ≤2 to 3° C. or ≤0.5 to 1° C. from the predetermined target value. For temperature control or regulation there can be provided temperature sensors 51 so arranged that they detect the temperature of the pressing device or the pressing element, in particular the surface of the pressing element. For that purpose the respective temperature sensor 51 can be in heat-transferring contact with the surface of the pressing element. Possibly at another suitable location the temperature sensor can also detect a reference temperature which is a measurement of the temperature of the pressing element or the surface temperature thereof. Thus, for example, the temperature can be measured at a region of an element of the pressing device, which is in heat exchange relationship with the pressing element, for example the pressure application device (in particular the pressure application roller), the drive element (for example the drive roller, in particular also the pressure application roller), a direction-changing device (in particular a roller), a support device for the pressing element (in particular a roller), a lateral guide of the pressing element or another suitable location. In that case, as stated hereinbefore, the pressing element is preferably in the form of an endless belt.

The alarm device 55 can be of such a configuration that, when an upper target value is exceeded and/or when the value falls below a lower target value, the temperature alarm is triggered, for example an opto-acoustic alarm. If the deviation from the target value should go beyond a predetermined amount the alarm device can output a signal to a control device of the separating machine, which stops it.

For cooling the pressing element in the form of the endless belt, it has often been found to be sufficient for one or more of the rollers around which the endless belt is guided and which come into contact with the endless belt at the roller periphery to be cooled. That can be in particular the pressure application roller and/or a tensioning roller and/or one or more direction-changing rollers and/or a plurality of support rollers for supporting the pressing device in the region in which the product to be separated is urged through the drum by means of the pressing device. Occasionally it has been found to be sufficient if only the shaft of the respective roller is provided with a coolant passage, for example in the form of an axial bore. Possibly it is also possible for regions of the roller, that are near the surface, to be provided with coolant passages.

The endless belt 6, therefore, extends around the peripheral surface 4 of the drum 2, forming a narrowing gap S. In that case provided between the endless belt and the drum 2 is a constriction region B at which the spacing between the endless belt and the drum is at its smallest. In this case the drum peripheral surface is concavely curved, the endless belt extending partially around the drum is convex, the belt going into a concavely curved region by a change in direction. In this case a reference point P is to be found at the belt surface 6a, at which point a line perpendicular to the belt surface bears tangentially at the tangential point T against the peripheral surface 4 of the drum. In this arrangement the endless belt extends around the drum 2 through such a wide part of its periphery so that an angular extent of about 180° around the drum surface is included between the constriction region B and the tangential point T.

In addition, in accordance with a preferred embodiment of the present invention, the narrowing gap between the endless belt and the drum is to narrow only 'slowly', wherein the gap is of a comparatively small width. Reference is to be made to the connecting line between the axis of rotation 3 of the drum and the axis of rotation 10 of a direction-changing roller of the endless belt, which bears against the endless belt at the region at which the reference point P is arranged. The gap between the drum and the endless belt is of a width W along that connecting line. Referring to that connecting line between the axis of rotation 3 of the drum and the axis of rotation 10 of the direction-changing roller, the width W of the gap S is ≤60-75%, preferably ≤40-50%, particularly preferably ≤30-35% of the radius r of the drum 2, here about 30% thereof. That can apply generally in accordance with a preferred embodiment of the present invention, in particular in combination with the described part-peripheral extent of the endless belt around the drum in relation to the angular extent between the constriction region B and the tangential point T, as described above.

Figure 2A:
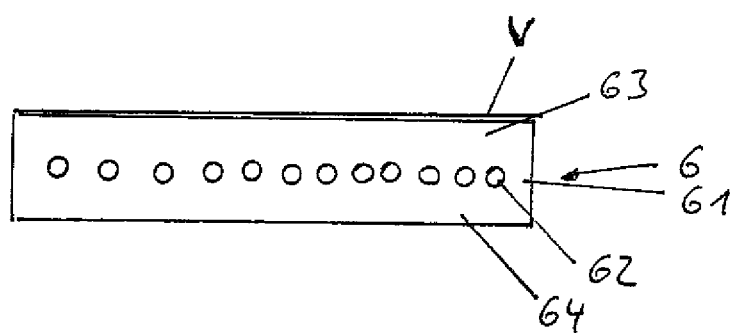
FIGS. 2a and 2b show diagrammatic cross-sectional views of endless belts of the separating machine of FIG. 1.
Figure 2B:
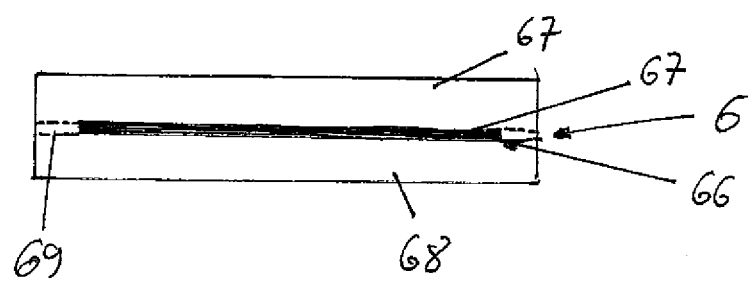

Referring to FIG. 2a, the belt 6 has an intermediate layer 61 which extends in the longitudinal direction of the belt and which affords tensile strength, with a tensile carrier 62, here in the form of metal cables (or textile material, plastic material etc). The tensile carriers 62 are embedded at both sides in a deformable, in particular elastically deformable material, here a plastic material like PU rubber. The tensile-strength layer is therefore covered at the top side and the underside with the deformable material, that is to say the layers 63, 64. The tensile-strength layer has a layer thickness of 5 mm. The top-side and underside cover layers each have a layer thickness of 6 mm. The cover layer has a Shore A-hardness of 80. A wearing layer V can be arranged above the cover layer. Referring to FIG. 2b, the belt 6 has an intermediate layer 66 which extends in the longitudinal direction of the belt and which affords tensile strength, with a tensile carrier 67 in the form of a textile layer of a thickness of 4 mm. Arranged on both sides of the intermediate layer 66 are a separate upper cover layer 67 and a lower cover layer 68, each of a thickness of 8 mm, wherein the intermediate layer is delimited by edge termination regions 69 for example of an elastic material 69. The upper cover layer is of a thickness of 8 mm and a hardness of 90 Shore A. The lower cover layer is of a thickness of 8 mm and a hardness of 80 Shore A. In other respect attention is directed to the belt shown in FIG. 2a, the description relating thereto correspondingly applies here. In one preferred embodiment of the present invention, the tensile strength of the intermediate layer and of the whole belt is higher in the longitudinal direction of the belt than in the transversal direction of it. In another preferred embodiment of the present invention, the tensile strength of the intermediate layer and of the whole belt is roughly equal in the longitudinal direction of the belt than in the transversal direction of it.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A separating machine for separating products of soft and harder consistency, comprising:
    a drum drivable in rotation about an axis thereof, a peripheral surface of the drum including a plurality of holes;
    a pressing device comprising a deformable endless belt, extending partially around the drum and having at least an elastic surface which works against the drum, for pressing the product to be separated against the peripheral surface of the drum so that product components of soft consistency pass through the drum; and
    at least one cooling device that cools the pressing device or the deformable endless belt, at least one cooling element of the at least one cooling device being in body-to-body contact with the deformable endless belt.

2. The separating machine according to claim 1, wherein at least one other cooling element of the at least one cooling device bears in heat-dissipating relationship against the deformable endless belt, the cooling element being a roller.

3. The separating machine according to claim 1, wherein
    (i) the deformable endless belt can be pressed against the drum by at least one pressure application device, or
    (ii) the deformable endless belt is driven by a drive by at least one drive element, or
    (iii) the deformable endless belt is guided around at least one direction-changing device having at least one direction-changing element or at least one guide device having at least one guide element for laterally guiding the deformable endless belt, or
    (iv) the deformable endless belt is tensioned by a tensioning device having at least one tensioning element acting on the deformable endless belt,
    and at least one or more of the elements from the group consisting of the pressure application element, the drive element, the direction-changing element, the guide element and the tensioning element are cooled or coolable by the at least one cooling device.

4. The separating machine according to claim 1, wherein the deformable endless belt is deflected around at least two direction-changing regions, and the at least one cooling device comprises at least one cooling element arranged between two direction-changing regions of the deformable endless belt and bears in heat-dissipating relationship against the deformable endless belt.

5. The separating machine according to claim 1, wherein a coolant is guided in a closed circuit through the at least one cooling device.

6. The separating machine according to claim 1, wherein the at least one cooling device is configured to cool the deformable endless belt to a temperature of ≤30 to 40° C. during operation of the separating machine.

7. The separating machine according to claim 1, wherein the at least one cooling device is configured to prevent thermally induced adhesion of the product to the pressing device during operation of the separating machine at maximum cooling power of the at least one cooling device.

8. The separating machine according to claim 1, wherein the at least one cooling device is configured to allow a product component which passes through the drum, to be at least substantially at the same temperature after passing through the drum as prior to the feed to the pressing device or the separating machine.

9. The separating machine according to claim 1, further comprising temperature regulation or temperature control for regulating or controlling a temperature of the deformable endless belt.

10. The separating machine according to claim 9, wherein the temperature regulation device has an alarm function.

11. The separating machine according to claim 10, wherein the alarm function is such that alarm triggering is effected upon a deviation of the temperature of the pressing device or the separated-off product of soft consistency or the product of hard consistency from a target value or a target value range.

12. The separating machine according to claim 1, wherein the at least one cooling device has a cooling power of at least 0.1 to 0.2 kW.

13. The separating machine according to claim 1, wherein the deformable endless belt extends around the drum forming a narrowing gap with a gap constriction region (B) of smallest spacing between the deformable endless belt and the drum and a gap inlet, wherein arranged at a surface of the deformable endless belt in the region of a changing curvature is a reference point (P) at which a line perpendicular to the surface of the deformable endless belt touches the peripheral surface of the drum at a tangential point (T) and wherein an angular extent around the drum of ≥110° is included between the constriction region (B) and the tangential point (T).

14. A method of separating products of soft and harder consistency using a separating machine according to claim 1, comprising the steps of:
    feeding the product to be separated to the pressing device,
    pressing the deformable endless belt against the peripheral surface of the drum so that the product components of soft consistency pass through the drum, and
    cooling the pressing device or the deformable endless belt with the at least one cooling device.

15. The method according to claim 14, wherein a temperature of the pressing device is controlled to a predetermined target value by a control or regulating circuit.

16. The method according to claim 14, wherein the product to be separated is or includes a foodstuff.

17. The method according to claim 14, wherein the cooling step comprises cooling the deformable endless belt to a temperature of less than or equal to 30° C., and, thereby, increasing at least one of the stiffness and strength of the deformable endless belt.

18. The method according to claim 17, wherein the cooling step further comprises cooling the deformable endless belt to a temperature of less than or equal to 0° C., and, thereby, further increasing at least one of the stiffness and strength of the deformable endless belt.

* * * * *